Figure 6:
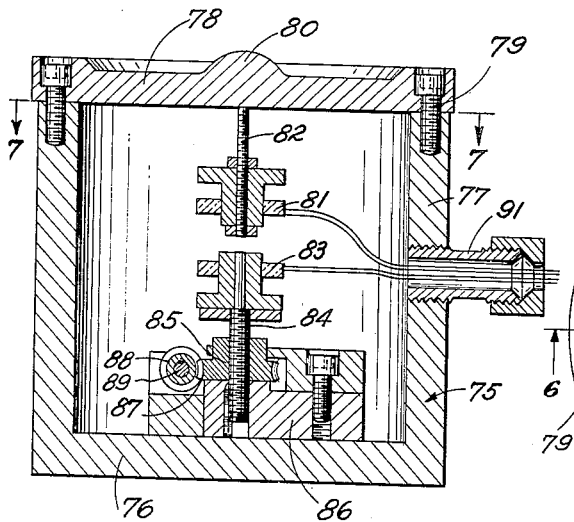

April 8, 1941.                F. M. DARNER                2,237,551
                             WELDING MACHINE
                          Filed March 21, 1939        4 Sheets-Sheet 1
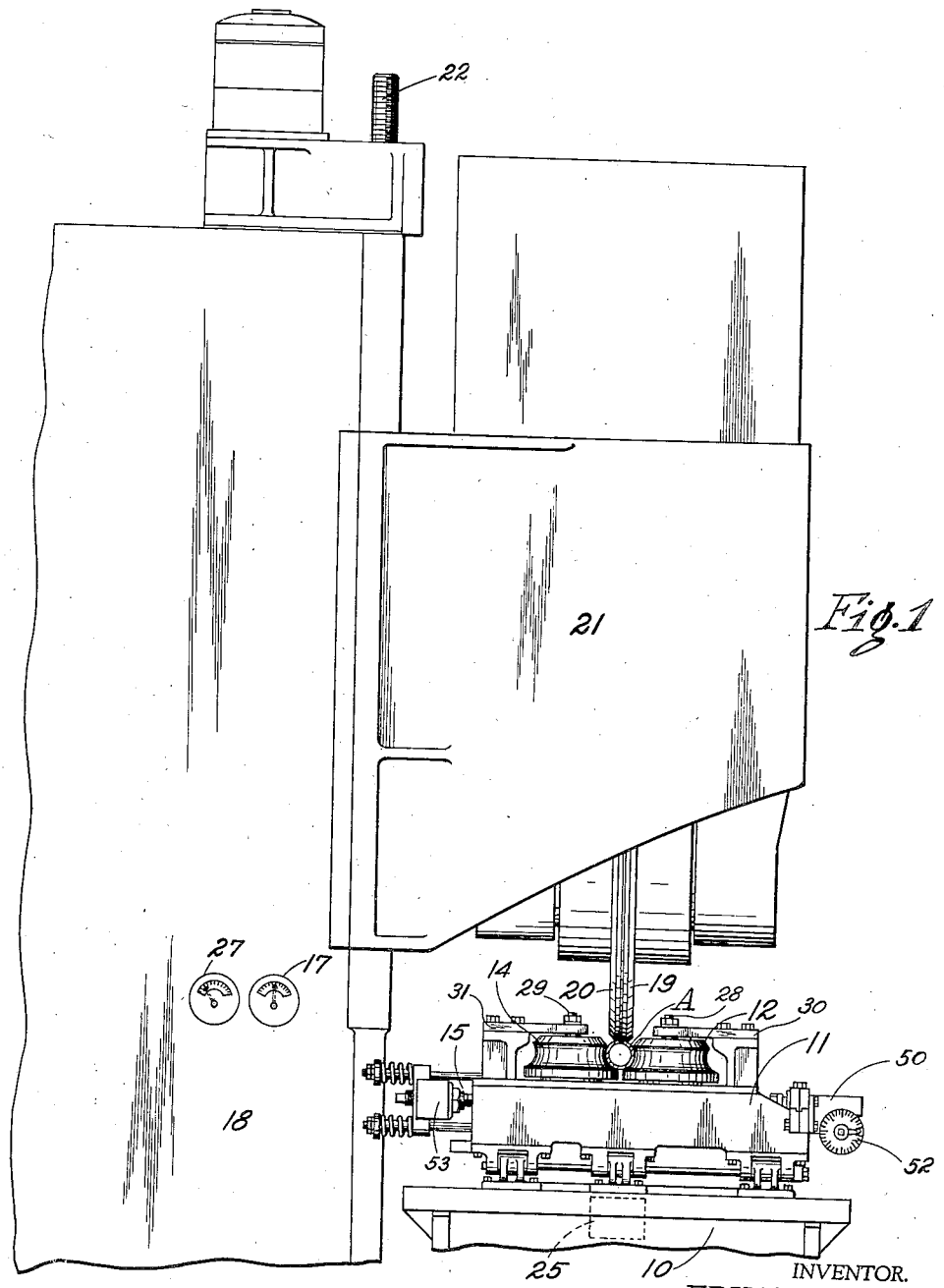
INVENTOR.
FREDERIC M. DARNER
BY
Richey & Watts
ATTORNEYS

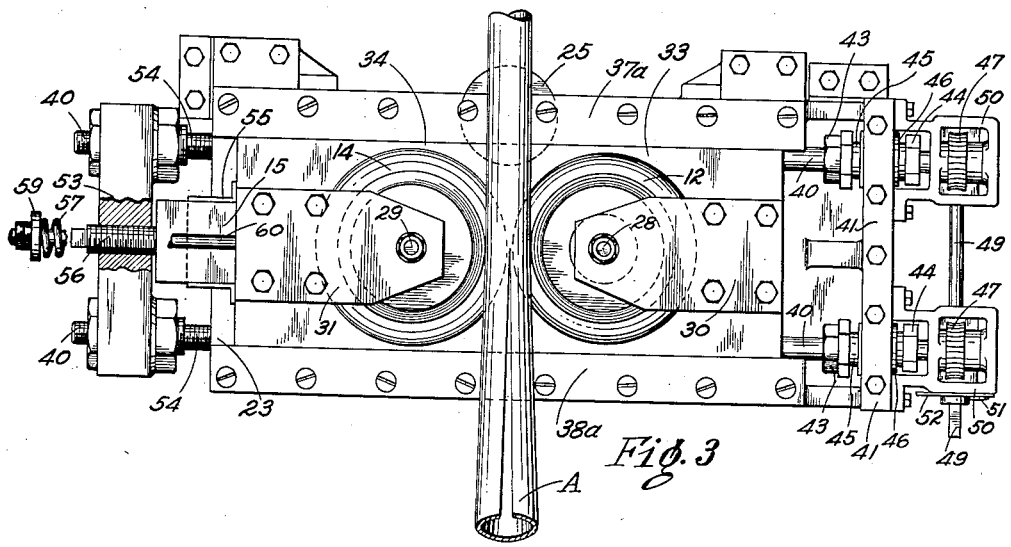
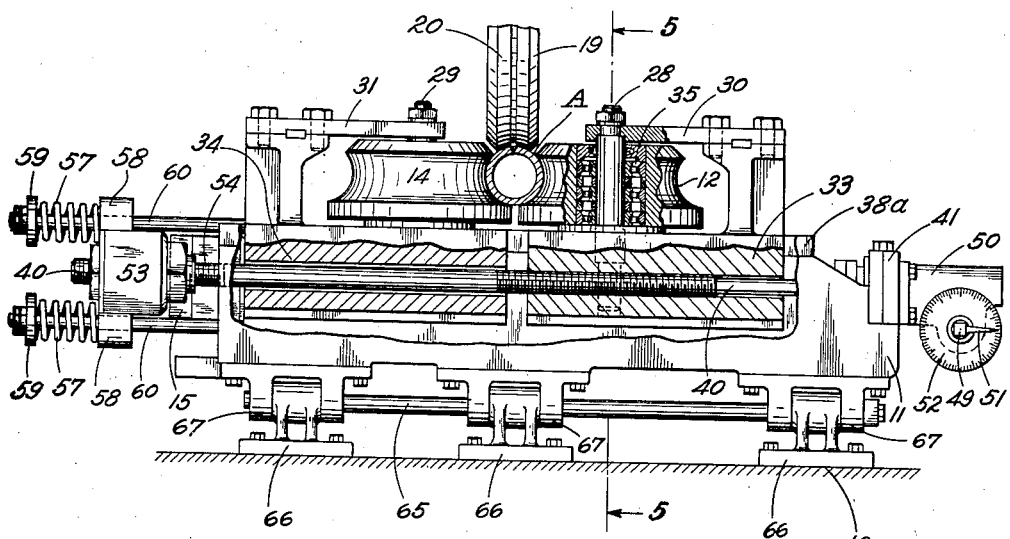

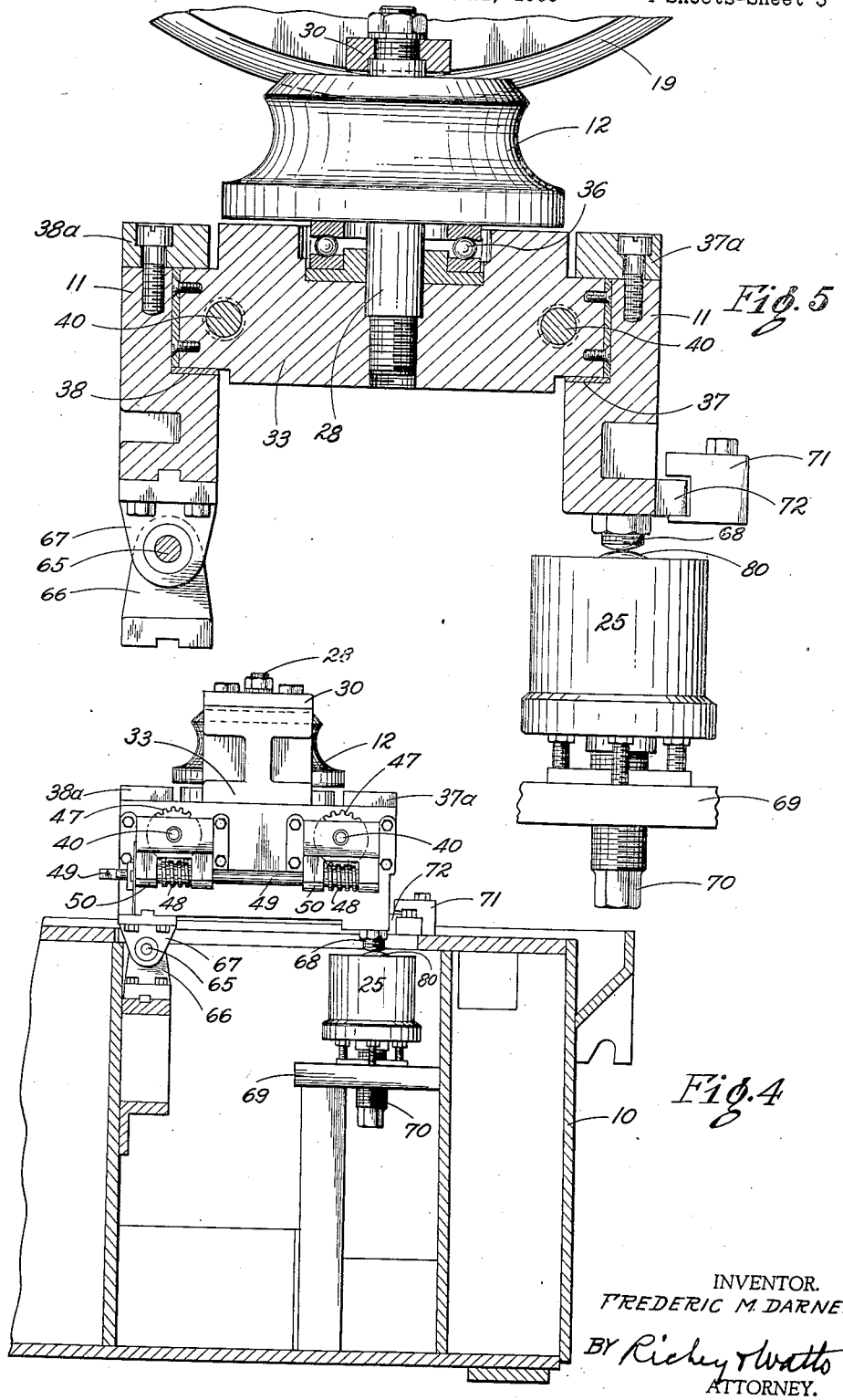

April 8, 1941.  F. M. DARNER  2,237,551
WELDING MACHINE
Filed March 21, 1939   4 Sheets-Sheet 4

INVENTOR.
FREDERIC M. DARNER
BY Richey & Watts
ATTORNEYS

Patented Apr. 8, 1941

2,237,551

UNITED STATES PATENT OFFICE 2,237,551

WELDING MACHINE

Frederic M. Darner, Shaker Heights, Ohio, assignor, by mesne assignments, to Republic Steel Corporation, Cleveland, Ohio, a corporation of New Jersey Application March 21, 1939, Serial No. 263,154

8 Claims. (Cl. 219—6)

This invention relates to the art of electric welding and more particularly to apparatus for welding tubing or pipe by the electric resistance method.

In the manufacture of electric welded tubing a metallic strip is formed into a tubular blank having abutting edge surfaces which are subsequently welded together as the blank passes through the welding throat of a welding machine. At the welding throat the edges of the tubing are urged together by devices such as pressure or welding rolls engaging opposite sides of the tube and the welding current may be supplied to the tubular blank by electrode rolls engaging the blank on either side of the seam. In order consistently to produce high quality tubing by such a method and apparatus it is desirable to correlate and maintain substantially constant the three principal factors determining the character of the weld, namely, the speed of the blank, the intensity of the current and the pressures exerted on the tube at the welding throat.

Heretofore it has been customary to employ various controlling devices and indicating mechanisms in conjunction with welding machines in order to maintain the speed of travel of the blank and the flow of welding current at the desired values. However so far as I am aware no one has provided a welding machine wherein the pressures exerted on the blank may be readily determined. It is therefore an object of my invention to provide a welding apparatus embodying means for measuring or indicating the pressure exerted on the blank as it passes through the welding throat. Another object is to provide an apparatus wherein such pressures can be readily adjusted and variations in the pressures continuously indicated. Another object is to provide a welding machine embodying apparatus for separately adjusting and indicating the pressures exerted by the welding rolls urging the edges of the seam together and the pressures exerted by the electrodes against the blank. Another object is to provide an apparatus which will instantaneously show any variations in welding pressures which may occur during the operation of the machine. A further object is to provide a sturdy and efficient apparatus which will accurately indicate the welding pressures.

Figure 7:
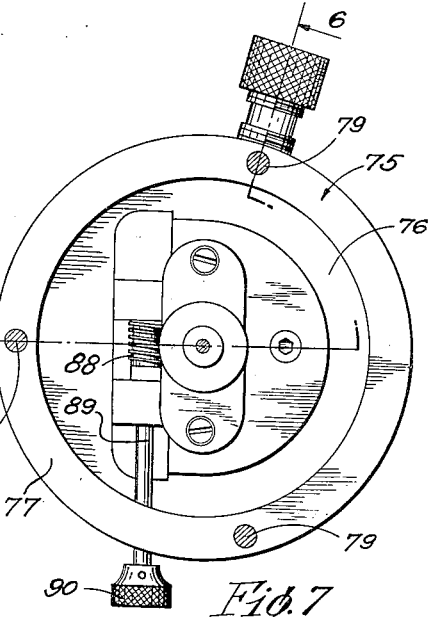
Figure 8:
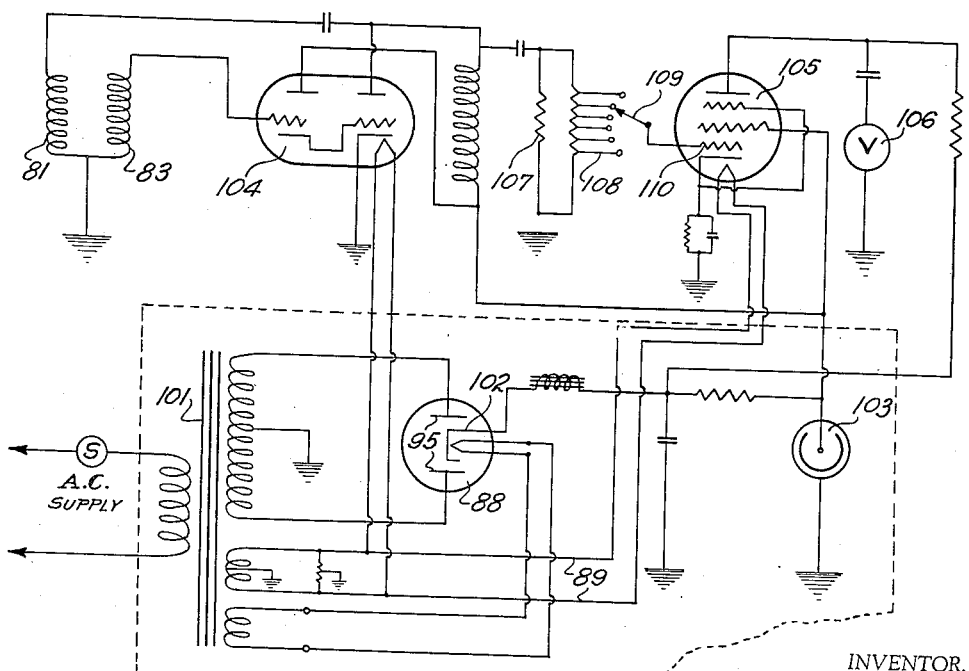

Other objects and advantages of the invention will become apparent from the following description of a preferred form thereof taken in conjunction with the accompanying drawings wherein:

Figure 1 is an end elevation of a welding machine embodying my invention; Figure 2 is an end view, partially in section, on an enlarged scale, showing the welding throat of the machine illustrated in Figure 1 and including the welding or pressure rolls and a portion of the electrode rolls; Figure 3 is a plan view of the apparatus shown in Figure 2 with parts broken away and the electrode rolls removed for convenience of illustration; Figure 4 is an elevational view partly in section showing the apparatus illustrated in Figure 3; Figure 5 is an enlarged sectional view taken along the line 5—5 of Figure 2; Figure 6 is a sectional illustration of a preferred form of pressure responsive device utilized to measure the pressures exerted in the apparatus; Figure 7 is a sectional view of the pressure responsive device as indicated by the line 7—7 on Figure 6; and Figure 8 is a wiring diagram illustrating a preferred form of the electrical circuit used in conjunction with the pressure responsive device shown in Figures 6 and 7 to indicate the welding pressures.

As shown in Figure 1 of the drawings a preferred form of welding machine embodying my invention may comprise a suitable base or frame 10 having mounted thereon a carriage 11 on which the pressure or welding rolls 12 and 14 are adjustably mounted. The rolls 12 and 14 engage opposite sides of the tubular blank A and urge the edges thereof together, the position of the rolls being adjustable by mechanism to be described below so that the pressure exerted on the blank can be varied by the rolls. According to my invention this pressure is preferably transmitted through and measured by the pressure responsive device 15, variations in the pressure being indicated by the gage or meter 17 which may be mounted at any convenient location, for example, on the upright frame member 18.

The welding current is supplied to the tube through electrode rolls 19 and 20 engaging opposite sides of the seam of the blank A. The electrode rolls may be carried by suitable bearings in bracket 21 which in turn is mounted for vertical adjustment by means of the screw mechanism 22 on the upright frame member 18. The pressures exerted by the electrodes on the tube may be adjusted by vertical adjustment of the electrode rolls and are preferably measured by a pressure responsive device 25 similar in all material respects to the pressure responsive device 15 and positioned to measure the downward thrust exerted on the welding rolls 12 and 14 by the tube blank A, which thrust is due to the pressure exerted by the electrode rolls against the blank. The pressure changes as measured by the pressure responsive device 25 preferably are indicated by the gage or meter 27 mounted adjacent meter 17. If desired one or both gages or meters may include recording mechanism.

To provide for adjustment of the welding rolls 12 and 14 and also to provide means for indicating the pressure which the rolls exert on the tube, the rolls are preferably mounted as shown in Figures 2 to 5 for rotation on vertical shafts 28 and 29, respectively, which in turn are carried by slides 33 and 34 mounted in carriage 11. The upper ends of the shafts may be supported by brackets 30 and 31 mounted on slides 33 and 34, respectively, and the rolls may be carried on bearings such as those illustrated at 35 and 36. Both slides are supported by shoulders 37 and 38 in the carriage and are retained in position by gibs 37a and 38a. The slide 33 supporting roll 12 may be moved along the shoulders 37 and 38 by rotation of the screws 40 which are in threaded engagement therewith as shown in Figures 2 and 5. The screws 40 pass through openings in a bracket 41 supported by the carriage 11, and endwise movement of the screws with respect to the carriage is prevented by the nuts 43 and 44 mounted on the screws 40 together with their associated bearing washers 45 and 46. At their ends the screws 40 are provided with worm wheels 47 which are engaged by worms 48 mounted on shaft 49 which is suitably supported in brackets 50. Thus rotation of the shaft 49 will result in simultaneous rotation of the screws 40 and corresponding movement of the slide 33 and pressure roll 12. The position of the adjusting mechanism may be indicated by the pointer 51 and the dial 52, the pointer being carried by shaft 49 while the dial is mounted on the bracket 50.

The pressure roll 14 is also moved, in a direction opposite to the movement of roll 12, by the screws 40 which extend through but do not engage slide 34, and project beyond the opposite end of the carriage 11. The yoke 53 is in threaded engagement with the projecting ends of the screws 40 which are provided with threads 54 of opposite hand to those engaging slide 33. Thus rotation of the screws 40 by means of the shaft 49 will cause the yoke 53 to be moved in a direction opposite to the direction of movement of the slide 33. That is, rotation of shaft 49 in one direction will cause slide 33 and yoke 53 to approach each other while rotation in the opposite direction will move them farther apart.

The movement of yoke 53 is transmitted to the slide 34 through the pressure responsive device 15 which is mounted on slide 34 by the cup shaped member 55 (see Figure 3) and which is engaged by the end of screw 56 mounted on yoke 53. To maintain constant engagement between the pressure responsive device 15, the yoke 53 and the slide 34, springs 57 acting between ears 58 formed on the yoke 53 and washers or stops 59 carried by the rods 60 are employed. The rods 60 are mounted on the slide 34 so that the springs 57 constantly urge the slide toward the yoke. The forces exerted by the springs are small in comparison to the pressures of the welding rolls against the tube and for most purposes can be disregarded. Thus the forces transmitted between slide 34 and yoke 53, through the pressure responsive device 15 are substantially equal to the pressure exerted by rolls 12 and 14 on the tube A. By means to be described in detail below, the forces to which device 15 is subjected are indicated on gage 17, which thus furnishes a continuous indication of the pressures between rolls 12 and 14 and the tube.

In order to measure the pressures exerted by the electrode rolls 19 and 20 upon the tube A carriage 11 is mounted for limited rotational movement with respect to the base 10. As shown particularly in Figures 2, 4 and 5 the pivotal mounting may comprise hinge shaft 65 supported from the base 10 by brackets 66 and engaged by members 67 mounted along one end of the carriage 11. The carriage is supported at its opposite end by an adjusting screw 68 which rests upon the upper surface of the pressure responsive device 25 which is supported on the bracket 69 mounted within the base 10. Preferably the device 25 is adjustably supported on the bracket 69 by the jack screw 70. Preferably the pivotal movement of the carriage with relation to the base 10 is limited by the slotted member 71 which is bolted to the frame 10 and receives the lug 72 formed on the carriage 11. The dimensions of the lug 72 are slightly smaller than the dimensions of the slot or groove in the member 71 so that a slight rocking movement of the carriage about the rod 65 is permitted.

By this construction the pressure exerted by screw 68 on the pressure responsive device 25 is a function of the pressure exerted on the tube by the electrodes 10 and 12. In the embodiment shown the leverage is such that, after allowance has been made for that portion of the weight of the carriage which is supported by pressure responsive device 25, the pressures exerted on the device 25 are equal to about one-half the pressures exerted by the electrode roll. Thus by properly calibrating the pressure responsive device 25 and its associated mechanism the gage 27 will accurately indicate the pressures exerted on the tube by the electrodes 10 and 12.

The pressure responsive devices 15 and 25 may be constructed in any convenient manner. For example, if desired, an hydraulic bellows or cylinder might be employed in which case ordinary pressure gages could be employed to indicate the welding pressures. However, I preferably employ the device shown in Figures 6 and 7 in conjunction with the electrical apparatus diagrammatically illustrated in Figure 8 in order to obtain an accurate and a simple pressure indicating device in which the variations in pressure can be indicated with very small movements of the parts. A preferred form of such device comprises a housing 75 having a closed bottom wall 76 and a cylindrical side wall 77. The open end of the housing is closed by a diaphragm 78 secured to the wall 77 as by screws 79 and having a rounded central projection 80. As installed to measure the pressure of the welding rolls, the housing 75 of device 15 is secured to the slide 34 while the hollow-pointed screw 56 on yoke 53 engages the projection 80 on diaphragm 78. Similarly the base or bottom wall 76 of pressure responsive device 25 is supported from bracket 69 by jack screw 70, while projection 80 is engaged by screw 68 projecting downwardly from the carriage 11. Thus in both instances the forces transmitted through the diaphragms 78 vary with the pressures, and therefore the deflections of the diaphragms will be functions of the pressures applied.

To measure the deflections and thus to determine the pressures, I preferably employ a coil 81 supported within the housing from the diaphragm 78 by a threaded rod 82 while a similar coil 83 is supported from the bottom wall 76 of the housing by a screw 84 which is engaged by nut 85 supported by suitable bearings carried by the blocks 86. The nut 85 is formed integrally with a worm wheel 87 engaged by a worm 88 mounted on shaft 89 which projects through the side wall 77 of the housing and is provided at its end with the knob 90 whereby the rod can be rotated to raise and lower the coil 83 to thus adjust its position with respect to the coil 81. Leads from the coils 81 and 83 are carried to the exterior of the housing through nipple 91 threaded into the side wall 77.

It will be evident that variations in the loads applied on the diaphragm 80 will cause variations in the deflection of the diaphragm and will result in relative movement between the coils 81 and 83. It is this relative movement which I employ to give an indication of the pressures exerted by the welding rolls and the electrodes, through the preferred form of electrical circuits illustrated in Figure 8.

As shown in Figure 8 the coils 81 and 83 are connected in series with the common terminals of the coils grounded. Therefore the impedance of the circuit including the coils will be changed by variations in the distance between the coils caused by deflections of the diaphragm 78 under load. To supply a high frequency alternating current to this circuit and to measure and indicate the resulting changes in the current due to changes in the distance between the coils I preferably employ a vacuum tube circuit of the type illustrated. This comprises a power supply unit including the transformer 101, having its primary connected to a 110 volt alternating current supply and having secondary windings adapted to produce the various filament and plate voltages for energizing the several vacuum tubes, the rectifier tube 102 and the voltage regulator tube 103 which, in conjunction with the circuits shown, function to maintain the output voltages of the power unit substantially constant regardless of fluctuations in the load or fluctuations in the alternating current supply voltage. The circuit also includes the oscillator tube 104 shown herein as a tube of the triadyne type which generates a high frequency alternating current supplied to the coils 81 and 83.

The strength of the high frequency current generated by tube 104 is varied by the relative position of coils 81 and 83. Thus the output of tube 104 varies in accordance with the load on the diaphragm 78 of the pressure indicating device. The output of tube 104 as controlled by the position of coils 81 and 83 is fed to the control grid of amplifier tube 105 which in turn operates voltmeter 106. Thus by the connections shown the voltmeter will indicate variations in the distance between the coils 81 and 83 and since these variations are caused by deflections of the diaphragm 78, the voltmeter will show the pressures exerted thereon.

To provide a multi-range instrument I preferably employ resistors 107 and 108 and selector switch 109 in conjunction with vacuum tube 105. By means of the switch the percentage of the output voltage of tube 104 impressed upon the control grid 110 of tube 105 may be varied so that the instrument may be used under a wide range of different pressure conditions.

In the welding apparatus shown two pressure responsive devices 15 and 25 are utilized as previously described. Separate electrical circuits and voltmeters are employed, the voltmeters 106 for devices 15 and 25 constituting gages 17 and 27, respectively, as shown in Figure 1. Each pressure indicator may be readily calibrated by setting up its pressure responsive unit in a compression testing machine. Then with no load on the unit the voltmeter or gage 17 or 27, as the case may be, is brought to a desired zero reading by rotating the knob 90 to adjust the distance between the coils 81 and 83 to bring the needle of the voltmeter to some arbitrarily selected point, preferably near the center of the scale. The position of knob 90 is noted, then increments of load are applied to the diaphragm 78 by the testing machine and the voltmeter again brought to the same point by turning the knob 90, the number and direction of the turns required to bring the voltmeter to the established point being recorded for each increment. This furnishes data for calibration of the relationship between the load on the diaphragm and the various settings of knob 90 giving a constant reading of meter 106. For each position of knob 90 selected, the apparatus is calibrated for smaller load increments until the meter reading is zero and then increasing the load until the meter reads full scale, noting the meter readings corresponding to various loads within this range. This procedure may be carried out for all of the various positions of the selector switch 109 so that the instrument will be calibrated for a wide range of loads.

After calibration the pressure responsive devices are placed as described in the welding machine, the no-load calibration of both instruments is checked, a tube A is run between the welding rolls and beneath the electrodes, and then the knobs 90 of both devices are adjusted to bring the needles of meters 17 and 27, back to their arbitrarily selected zero positions, whereupon the pressures on the tube can be determined from the positions of the knobs 90 of each instrument. Variations in pressures during operation of the machine are indicated by movement of the needles of the meters 17 and 27 to one side or the other of the previously established zero point. Thus the instruments give continuous and accurate indications of the welding pressures employed, and by means of the adjustments for the electrodes and the welding rolls, the operator of the machine can maintain the welding pressures at the correct values, and can quickly adjust the machine to the welding pressures desired.

From the foregoing description of a preferred form of my invention it will be evident that I have provided a welding apparatus in which the welding pressures applied to the tube at the welding throat are accurately indicated and in which the pressures may be readily adjusted to their correct values. My apparatus gives a constant and instantaneous indication of the welding pressures exerted by the welding rolls as well as by the electrodes. By my invention it is now possible to control accurately all of the important factors determining the character of the weld produced by a tube welding machine, namely; speed of the tube, welding current, and the pressures applied at the welding throat. My pressure responsive devices are sturdy and efficient and accurately indicate the welding pressures, and because the devices indicate pressures with only very minute movements of the parts, they do not change the normal operation of the machine except to make it possible for the operator to maintain correct pressures at all times.

In the foregoing specification I have described a preferred form of my invention as applied to one particular type of tube welding machine. It will be evident to those skilled in the art that the invention can be adapted to other types of welding machines, and that various changes and modifications can be made in my apparatus without departing from the teachings of my invention. Therefore it is to be understood that my patent is not limited to the preferred form described herein or in any manner other than by the scope of the appended claims.

I claim:

1. In a welding machine a frame, a carriage pivotally mounted on said frame, welding rolls supported by said carriage and adapted to engage opposite sides of a tube passing through said machine, electrode rolls adjustably supported by said frame and engaging said tube in the region adjacent said welding rolls, the pressure between said electrode rolls and said tube urging said tube into engagement with said welding rolls and tending to rotate said carriage about its pivotal mounting on said frame, and pressure responsive means interposed between said carriage and said frame for supporting said carriage against rotation and indicating the pressure exerted by said electrode rolls on said tube.

2. In a welding machine, a frame, a carriage mounted on the frame, slides mounted on said carriage, welding rolls carried by said slides and adapted to be moved toward and away from each other and into engagement with a tube blank passing through said machine, and means for urging said slides and said welding rolls toward each other comprising a screw in threaded engagement with one of said slides and extending through the other of said slides, a yoke in threaded engagement with a portion of said screw projecting beyond said second slide, the threads on said screw being arranged so that rotation of said screw causes said yoke and said first slide to be moved in opposite directions, and a pressure responsive device interposed between said yoke and said second slide for transmitting the movement of said yoke to said second slide and for urging said second slide toward the said first slide.

3. In a welding machine a frame, a carriage pivotally mounted on the frame, welding rolls mounted on said carriage and adapted to engage opposite sides of a tube blank passing through said machine, means for urging said rolls toward each other and into engagement with said blank including a pressure responsive device for indicating the pressures between said welding rolls and said blank, electrode rolls adjustably supported by said frame and adapted to engage the upper surfaces of said blank and pressure responsive means interposed between said carriage and said frame for at least partly supporting said carriage and indicating the pressure exerted by said electrode rolls against said blank.

4. In a continuous tube welding machine the combination of opposed welding rolls, means to propel a tube blank axially between and in contact with said rolls, a fixed member, means carrying at least one of said welding rolls and movable toward and away from said fixed member, electrode rolls engageable with and applying pressure to said blank tending to move said movable member relative to said fixed member, and means for indicating the pressure so applied, and serving to transmit said pressure from said movable member to said fixed member.

5. In a continuous tube welding machine the combination of opposed welding rolls movable relative to each other, means to propel a tube blank axially between and in contact with said rolls, a frame, supporting means carrying said welding rolls and pivotally movable toward and away from said frame, electrode rolls engageable with the tube blank adjacent to said welding rolls, said electrode rolls exerting pressure on said blank and welding rolls tending to move said welding rolls apart and said pivoted member toward said frame, pressure indicating means serving to transmit from one of said welding rolls to the other the pressure which tends to move said welding rolls apart and pressure indicating means serving to transmit to said frame the pressure which tends to move said pivoted means toward said frame.

6. In a continuous tube welding machine the combination of a fixable member carrying a welding roll, a member slidable relative to said fixable member and carrying a second welding roll, means to propel a tube blank axially between and in contact with said welding rolls, electrode rolls engageable with and applying pressure to said blank tending to move said slidable member relative to said fixed member, and means indicating the pressure applied to said movable member and serving to transmit said pressure from said movable member to said fixed member.

7. In a continuous tube welding machine the combination of a fixed member, a pivoted member carrying opposed welding rolls and capable of limited movement toward and away from said fixed member, means to propel a tube blank axially between and in contact with said welding rolls, means including electrode rolls for applying pressure to the tube and thence through the welding rolls to said pivoted member tending to move the pivotal member towards said fixed member, and means indicating the pressure so applied and serving to transmit said pressure from said pivoted member to said fixed member.

8. In a continuous tube welding machine, the combination of a frame, sets of welding rolls and electrode rolls operatively connected to said frame and constituting a welding throat, one of said sets of rolls being capable of limited movement relative to said frame, means to propel axially through said welding throat a tube blank with coincident creation of pressures tending to move said movable set of rolls relative to said frame, and means for indicating such pressures and serving to transmit them from said movable set of rolls to said frame.

FREDERIC M. DARNER.